US011999654B2

(12) United States Patent
Larsen et al.

(10) Patent No.: US 11,999,654 B2
(45) Date of Patent: Jun. 4, 2024

(54) METHOD FOR MAKING CONCRETE ADMIXTURES CONTAINING CARBON NANOPARTICLES

(71) Applicant: EDEN INNOVATIONS LTD., Perth (AU)

(72) Inventors: Allan Godsk Larsen, Gentofte (DK); Justin L. Fulton, Fort Collins, CO (US); Dustin Marion Hulbert, Highlands Ranch, CO (US); Gregory Evan Schmitt, Littleton, CO (US); Clint Shimon, Shelby Township, MI (US)

(73) Assignee: Eden Innovations Ltd., Perth (AU)

( * ) Notice: Subject to any disclaimer, the term of this patent is extended or adjusted under 35 U.S.C. 154(b) by 319 days.

(21) Appl. No.: 16/996,976

(22) Filed: Aug. 19, 2020

(65) Prior Publication Data

US 2021/0053872 A1    Feb. 25, 2021

Related U.S. Application Data

(60) Provisional application No. 62/890,158, filed on Aug. 22, 2019.

(51) Int. Cl.
*C04B 14/02*    (2006.01)
*C04B 14/06*    (2006.01)
(Continued)

(52) U.S. Cl.
CPC .......... *C04B 14/026* (2013.01); *C04B 14/062* (2013.01); *C04B 28/04* (2013.01); *B82Y 30/00* (2013.01); *B82Y 40/00* (2013.01)

(58) Field of Classification Search
CPC ... C04B 14/022; C04B 14/024; C04B 14/026; C04B 14/062; C04B 18/061; C04B 18/067; C04B 12/04
See application file for complete search history.

(56) References Cited

U.S. PATENT DOCUMENTS

| 4,318,744 A | 3/1982 | Dodson |
| 4,943,323 A | 7/1990 | Gartner et al. |

(Continued)

FOREIGN PATENT DOCUMENTS

| CN | 105622132 | 7/2017 |
| EP | 0 233 691 A1 | 8/1987 |

(Continued)

OTHER PUBLICATIONS

Madhanasree R.M. et al., "Study on Silica Fume Replaced Concrete With Super Plasticizer", ARPN Journal of Engineering and Applied Sciences, vol. 11, No. 9, May 2016, pp. 5971-5974.

(Continued)

*Primary Examiner* — Hoa (Holly) Le
(74) *Attorney, Agent, or Firm* — Stephen A. Gratton

(57) ABSTRACT

A method for making an admixture for concrete includes the steps of providing a carbon nanomaterial comprised of carbon nanoparticles and wetting and dispersing the carbon nanomaterial in a liquid organic solvent/compound mixture comprised of amine based compounds configured to de-agglomerate and uniformly disperse the carbon nanoparticles. The method also includes the step of selecting the organic/solvent compound mixture to perform the wetting and dispersing step and to also perform at least one additional function in a particular type of concrete. An admixture for making concrete comprises a suspension of uniformly dispersed carbon nanoparticles having a predetermined percentage range by mass of the admixture in an organic solvent/compound mixture comprising an amine based compound having a predetermined percentage range by mass of the organic solvent/compound mixture.

14 Claims, 2 Drawing Sheets

(51) Int. Cl.
*C04B 28/04* (2006.01)
*B82Y 30/00* (2011.01)
*B82Y 40/00* (2011.01)

(56) References Cited

U.S. PATENT DOCUMENTS

| | | | |
|---|---|---|---|
| 4,964,917 | A | 10/1990 | Bobrowski et al. |
| 4,990,190 | A | 2/1991 | Myers et al. |
| 6,358,310 | B1 | 3/2002 | Berke et al. |
| 6,387,173 | B2 | 5/2002 | Greenwood et al. |
| 6,875,417 | B1 | 4/2005 | Shah et al. |
| 7,666,327 | B1 | 2/2010 | Veedu |
| 7,744,690 | B2 | 6/2010 | Durst et al. |
| 7,985,354 | B1 | 7/2011 | Veedu |
| 8,016,938 | B2 | 9/2011 | Durst et al. |
| 8,092,778 | B2 | 1/2012 | Zhu et al. |
| 8,551,243 | B2 | 10/2013 | Soto Montoya et al. |
| 8,759,423 | B2 | 6/2014 | Chen et al. |
| 9,365,456 | B2 | 6/2016 | Shah et al. |
| 9,499,439 | B2 | 11/2016 | Shah et al. |
| 9,546,091 | B2 | 1/2017 | Yang et al. |
| 10,584,072 | B2 | 3/2020 | Fulton et al. |
| 11,124,458 | B2 | 9/2021 | Fulton et al. |
| 2002/0127351 | A1 | 9/2002 | Takikawa et al. |
| 2003/0148097 | A1 | 8/2003 | Takikawa et al. |
| 2008/0279753 | A1 | 11/2008 | Harutyunyan |
| 2011/0067864 | A1 | 3/2011 | Reddy et al. |
| 2011/0223343 | A1 | 9/2011 | Wang et al. |
| 2012/0042806 | A1 | 2/2012 | Hersam et al. |
| 2013/0305642 | A1 | 11/2013 | Propst |
| 2014/0080942 | A1 | 3/2014 | Brien |
| 2015/0203661 | A1 | 7/2015 | Ismail |
| 2017/0018324 | A1 | 1/2017 | Tokutomi et al. |
| 2017/0210282 | A1 | 7/2017 | Rodriguez Barros |
| 2018/0334407 | A1* | 11/2018 | Fulton .................. C04B 28/02 |
| 2020/0140342 | A1 | 5/2020 | Fulton et al. |
| 2021/0053872 | A1 | 2/2021 | Larsen et al. |

FOREIGN PATENT DOCUMENTS

| | | | |
|---|---|---|---|
| EP | 2 873 657 | A1 | 5/2015 |
| EP | 3 744 699 | A1 | 12/2020 |
| JP | 4150134 | B2 * | 9/2008 |
| WO | WO 2002/12080 | A1 | 2/2002 |
| WO | WO 2009/042452 | A1 | 4/2009 |
| WO | WO 2018/103814 | A1 | 6/2018 |
| WO | WO 2018/212889 | A2 | 11/2018 |

OTHER PUBLICATIONS

International Search Report in application No. PCT/US2018/028054 filed Apr. 18, 2018 entitled Methods and Systems for Making Nanocarbon Particle Admixtures and Concrete, dated Jun. 20, 2019, pp. 1-4.
International Written Opinion in application No. PCT/US2018/028054 filed Apr. 18, 2018 entitled Methods and Systems for Making Nanocarbon Particle Admixtures and Concrete, dated Jun. 20, 2019, pp. 1-13.
Solomon, G., "Investor Presentation: Carbon Nanotube Project. Eden Energy Ltd.", Perth, Western Australia; Jul. 27, 2015, pp. 1-21.
Zhao, Z. et al., "Research Article: Processing and Structure of Carbon Nanofiber Paper", Journal of Nanomaterials. Feb. 24, 2009, vol. 2009, Article ID 325769, Hindawi Publishing Corporation, pp. 1-7.
Solomon, G., "Eden: US Investor Presentation: Eden Innovations", Perth, Western Australia, May 2017, pp. 1-34.
Jang, H. et al., Emission Characteristic of Ammonia in Cement Mortars Using Different Sand from Area of Production, Environ, Eng. Res. Apr. 8, 2016, pp. 1-21.
Teng, T. P. et al., Fabrication and Characterization of Nanocarbon-Based Nanofluids by Using an Oxygen-Acetylene Flame Synthesis System, Nanoscale Research Letters, 2016, vol. 11, No. 288, pp. 1-13.
Moore, Valerie C. et al., Individually Suspended Single-Walled Carbon Nanotubes in Various Surfactants, Nano Letters, Sep. 9, 2002, vol. 3, No. 10, pp. 1-4.
Wang, Xiao Ying, et al. "Influence of Triethanolamine on the Properties of Cement-Based Materials." Materials Science Forum, vol. 898, Trans Tech Publications, Ltd., Jun. 2017, pp. 2010-2017. Crossref, doi:10.4028/www.scientific.net/msf.898.2010.
Xu, Z. & Xu, K. & Sun, J. & Hu, Y. & Ma, S. & Li, W. & Shen, X., (2017). Effect of New Alkanolamines on Cement Hydration and Hardening. Kuei Suan Jen Hsueh Pao/Journal of the Chinese Ceramic Society. 45. 1113-1120. 10.14062/j.issn.0454-5648.2017.08.09.
Lim Yaphary, Yohannes & Yu, Zec & Lam, Raymond & Lau, Denvid. (2017). Effect of triethanolamine on cement hydration toward initial setting time. *Construction and Building Materials*. 141. 94-103. 10.1016/j.conbuildmat.2017.02.072.
Xu, Zhi-Qiang et al. "Research on cement hydration and hardening with different alkanolamines." *Construction and Building Materials* 141 (2017): 296-306.
Zhang Yan-Rong, Kong Xiang-Ming, Lu Zi-Chen, Lu Zhen-Bao, Zhang Qing, Dong Biqin, Xing Feng, "Influence of triethanolamine on the hydration product of portlandite in cement paste and the mechanism", published 2016, Cement and Concrete Research 87, pp. 64-76.
Sintef Report Coin P1 Advanced cementing materials SP 1.2 F Controlling hydration development, Report No. SBF KK A07025, Sintef Building Infrastructure, Dec. 5, 2007, pp. 1-35.
Suhua Ma, Weifeng Li, Xiaodong Shen, Study on the physical and chemical properties of Portland cement with THEED ScienceDirect, Construction and Building Materials, vol. 213, Jul. 29, 2019, pp. 617-626.
International Application No. PCT/US20/47092, Search Report and the Written Opinion of the International Searching Authority, dated Nov. 18, 2020, pp. 1-8.x.
International Application No. PCT/US 22/33173, 'International Search Report and the Written Opinion of the International Searching Authority, or the Declaration', dated Oct. 22, 2022, pp. 1-15.
India Patent Application No. 202217009216, Examination Report, dated Oct. 20, 2023, pp. 1-6.

* cited by examiner

Providing A Carbon Nanomaterial Comprised Of Carbon Nanoparticles

Wetting And Dispersing The Carbon Nanomaterial In A Liquid Organic Solvent/Compound Mixture Comprised Of An Amine Based Compound Selecting The Organic/Solvent Compound Mixture To Perform The Wetting And Dispersing Step And To Also Perform At Least One Additional Function In A Particular Type Of Concrete

FIGURE 1

METHOD FOR MAKING CONCRETE ADMIXTURES CONTAINING CARBON NANOPARTICLES

CROSS REFERENCE TO RELATED APPLICATION

This application claims priority from U.S. Provisional No. 62/890,158, filed Aug. 22, 2019 which is incorporated herein by reference.

FIELD

This disclosure relates to a method for making concrete admixtures containing carbon nanoparticles, to concrete admixtures made using the method and to concrete mixing using the concrete admixtures.

BACKGROUND

Concrete admixtures containing carbon nanoparticles can be used to make high strength concrete as the carbon nanoparticles form strengthening nanostructures in the cured concrete. For example, the carbon nanoparticles can include carbon nanotubes (CNTs) and carbon nanofibers (CNFs), as well as other types of carbon nanoparticles, such as graphene particles, graphite particles and carbon black. Typically, the concrete admixtures are in liquid form, and are added to a concrete mixture either before or during concrete mixing. Exemplary concrete admixtures are manufactured in the US by Eden Innovations Ltd. as the EDENCRETE family of admixtures.

One aspect of manufacturing these admixtures is the incorporation of the carbon nanoparticles into the admixture. In particular, the carbon nanoparticles must be incorporated into the admixture in a quantity sufficient to facilitate the formation of carbon nanostructures in the cured concrete. In addition, the admixtures are typically manufactured in bulk, then packaged in containers and distributed to concrete manufacturing locations around the world. It is thus advantageous for the concrete admixtures to contain a large concentration of carbon nanoparticles in a small volume of admixture. Further, it is desirable for the carbon nanoparticles to remain suspended in the admixture over a period of time sufficient to perform construction activities.

The present disclosure is directed to a method for making concrete admixtures in which a large volume of carbon nanoparticles are effectively incorporated into a small volume of liquid admixture. In addition, the present method can be used with a significantly reduced amount of liquid water such that the weight and volume of the admixture are reduced.

SUMMARY

A method for making an admixture for concrete includes the initial step of providing a carbon nanomaterial comprised of carbon nanoparticles having a predetermined percentage range by mass of the admixture. The method also includes the step of wetting and dispersing the carbon nanomaterial in a liquid organic solvent/compound mixture comprised of an amine based compound configured to de-agglomerate and uniformly disperse the carbon nanoparticles. These steps are performed such that a large volume of carbon nanomaterial is contained in a small volume of admixture. Water is not needed for performing the wetting and mixing step but if desired can be added following or during the wetting and mixing step to achieve a particular function, such as adjusting the viscosity of the admixture.

The method also includes the step of selecting the organic/solvent compound mixture to perform the wetting and dispersing step and to also perform at least one additional function in a particular type of concrete. For example, the organic/solvent compound can also be selected to affect the curing time and properties of the concrete. The organic/solvent compound can also be selected to assist in increasing the strength of concrete incorporating a pozzolan material such as slag, fly ash, and micro silica, or be selected to increase abrasion resistance of the concrete, or be selected to reduce shrinkage of the concrete. Combining these additional concrete functions with the function of dispersing a large amount of carbon nanomaterial in a low volume of the organic/solvent compound, improves the concrete at unexpected very low dosages of admixture. Suggesting a synergy effect between the carbon nanomaterial and the amines not previously described in the literature.

An admixture for making concrete comprises a suspension of uniformly dispersed carbon nanoparticles having a predetermined percentage range by mass of the admixture in an organic solvent/compound mixture comprising an amine based compound having a predetermined percentage range by mass of the organic solvent/compound mixture. In addition, the amine based compound is selected to uniformly disperse the carbon nanoparticles to perform at least one additional function in a particular type of concrete.

BRIEF DESCRIPTION OF THE DRAWINGS

Exemplary embodiments are illustrated in the referenced figures of the drawings. It is intended that the embodiments and the figures disclosed herein be considered illustrative rather than limiting.

FIG. 1 is a flow diagram illustrating steps in a method for making an admixture for concrete.

DETAILED DESCRIPTION

Figure 2:
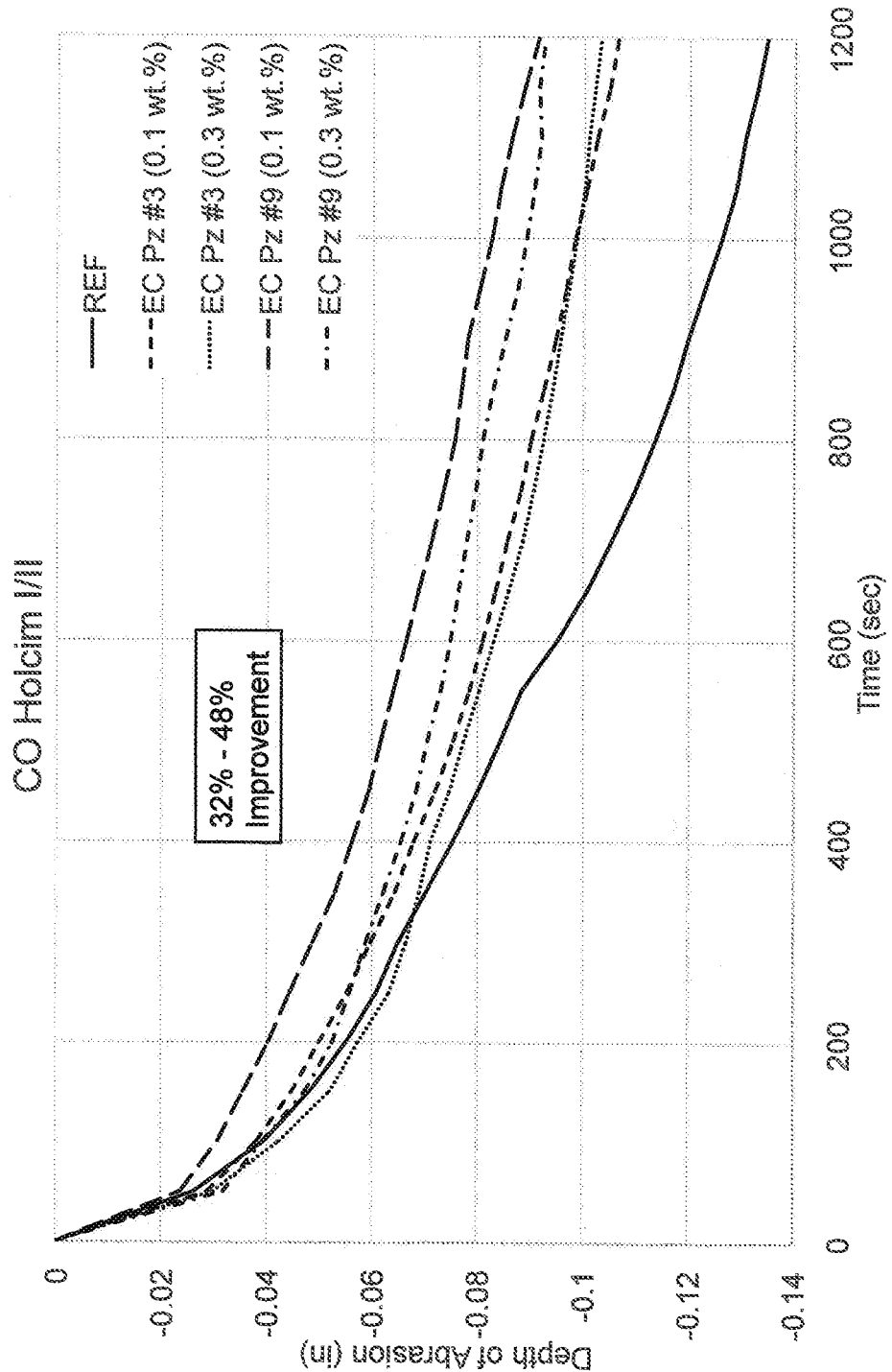
FIG. 2 is a graph showing depth of abrasion vs. time for Holcim I/II straight cement in reference and mixes with admixture #3 or #9 at dosages of 0.1 w/w % and 0.3 w/w %.

As used herein, the term "admixture" means ingredients added to concrete before or during mixing. U.S. Pat. No. 10,584,072, which is incorporated herein by reference, discloses admixtures containing carbon nanoparticles for making concrete. These admixtures are sometimes referred to in this disclosure as EDENCRETE. The term "amine" means a class of organic compounds of nitrogen that may be considered as derived from ammonia (NH3) by replacing one or more of the hydrogen atoms with alkyl groups or functionalized alkyl groups, for example hydroxyalkyl groups.

The term "concrete" means a material in either a cured or an uncured state that includes cement (with or without supplementary cementing materials, such as blast furnace slag, fly ash, limestone fines, and silica fume), mineral aggregate sand and stones, and water. The term "cement" means hydratable cement such as Portland cement produced from clinker containing hydraulic calcium silicates. The term "cementitious" means materials that form a plastic paste when mixed with a liquid, which harden and function as a glue or binder for holding the composite concrete material together. Cementitious materials form a hard matrix to bind aggregates and contribute to the properties of hardened concrete through hydraulic or pozzolanic activity. While Portland cement is a common concrete matrix material, alternative examples include, but not limited to, various limes and mortars, fly ashes, ground blast-furnace slag, and silica fume. The term "plasticizer" means a surfactant used to uniformly disperse particles in uncured concrete.

The term "carbon nanoparticle" means a particle comprising an allotrope of carbon with one or more particle dimensions on the order of 1000 nanometers (nm) or less. The term "carbon nanomaterial" means a mixture containing carbon nanoparticle. "Nanotubes" mean cylindrical nanostructures comprising one or more cylindrical tubes of atoms having a high length to diameter ratio. Nanotubes can be categorized as single-walled nanotubes (SWNTs) or multi-walled nanotubes (MWNTs). "Nanotube particles" comprise individual molecules, particles, or agglomerates of particles comprised of nanotubes. "Nanofibers" means cylindrical nanostructures with a high length to diameter ratio, with atomic layers in a stacked plate, cup, or cone configuration. "Nanofiber particles" comprise individual molecules, particles, or agglomerates of particles comprised of nanofibers. "Graphene" means small particles of a two-dimensional hexagonal lattice of $sp^2$ hybridized carbon atoms. Graphene is the basic structure of many other allotropes of carbon, including carbon nanotubes, carbon nanofibers, graphite, and other fullerenes. "Graphite" means a carbon crystalline atomic structure comprised of layers of graphene. "Carbon black" means a fine powder comprised of nanometer scale particles and agglomerates with an "amorphous" paracrystalline or polycrystalline atomic structure, usually made from decomposition and incomplete combustion of hydrocarbon feedstocks, but for the purposes of this disclosure, "carbon black" also includes finely-ground charcoal, coal, or activated carbon materials. "Nanodiamonds" means nanometer scale particles of a carbon allotrope with diamond crystal atomic structure. "Fullerene" means molecules or particles comprised of graphitic crystalline structures with defects in the hexagonal atomic lattice that bend or curve the layer(s) into spheres ("onions"), buds, cones, horns, tubes, or other composite shapes built from sub-structures with these simpler forms. "Nano-silica" means silica material with one or more particle dimensions on the order of 500 nanometers (nm) or less.

Providing A Carbon Nanomaterial Comprised Of Carbon Nanoparticles. The carbon nanomaterial can be produced using a heated reactor and catalytic decomposition of a hydrocarbon feed gas. For performing the production process, a catalyst and reaction conditions in the reactor are selected to provide different types of carbon nanoparticles in selected mass percentage ranges. For example, the reaction conditions and the catalyst can be selected and controlled such that the carbon nanomaterial includes at least two different types of carbon nanoparticles as described above.

Rather than being produced in a heated reactor, the carbon nanomaterial can be provided as a desired composition of carbon nanoparticles. For example, certain carbon nanomaterials are mass produced and commercially available in industrial commodity markets from a producer. With either production or commercial purchase of the carbon nanomaterial, different types of carbon nanoparticles produced from different processes can be blended or mixed together to provide a particular carbon nanomaterial having desired characteristics, such as desired mass percentage ranges of the different carbon nanoparticles. The step of providing the carbon nanomaterial can also include the step of crushing or grinding the carbon nanomaterial into a powder configured for uniform dispersion in a liquid. This process can be performed using a suitable mechanical crushing or grinding apparatus.

Wetting And Dispersing The Carbon Nanomaterial In A Liquid Organic Solvent/Compound Mixture Comprised Of An Amine Based Compound. For example, the amine based compound can comprise an alkanolamine, such as a compound selected from the group consisting of mono-ethanolamine, di-ethanolamine, tri-ethanolamine, tri-isopropanolamine, N-methyldiethanolamine, diethanolisopropanolamine (DEIPA), ethyldiisopropylamine (EDIPA), N,N,N',N'-tetrakis-(2-hydroxyethyl)-ethylenediamine (THEED) and N,N,N',N'-tetrakis-(2-hydroxypropyl)-ethylenediamine (THPE/EDTP).

Selecting The Organic/Solvent Compound Mixture To Perform The Wetting And Dispersing Step And To Also Perform At Least One Additional Function In A Particular Type Of Concrete. One feature of the present method is that the organic compounds are selected such that they have beneficial effects for the concrete making process or end product. Characteristics that can be controlled by selection of the organic/solvent compound include wet properties, curing time and process and/or properties of the resulting concrete.

As an example, the inventors have been working with a group of compounds, which by themselves give increased compressive strength, this group of compounds are amine based and have been used for a number of applications in concrete chemistry; for example as cement clinker grinding aids, accelerators, retarders etc. By combining these functionalities with the possibility of dispersing a large amount of carbon nanomaterial in a low volume of an organic compound, allows us to achieve huge benefits to the concrete mix at very low dosages.

Exemplary amine based compounds can be from the group of alkanolamines and can include; mono-ethanolamine, di-ethanolamine, tri-ethanolamine, tri-isopropanolamine, N-methyldiethanolamine, Diethanolisopropanolamine (DEIPA), ethyldiisopropylamine (EDIPA), N,N,N',N'-tetrakis-(2-hydroxyethyl)-ethylenediamine (THEED) and N,N,N',N'-tetrakis-(2-hydroxypropyl)-ethylenediamine (THPE/EDTP) etc.

Using the method unexpected results in the form of large benefits from the combination of carbon nanomaterial with the alkanolamines, much larger than what could be expected based on the effect from each of the components on their own. Also, using the method some of the restrictions and drawbacks from using alkanolamines are reduced or eliminated by the presence of carbon nanomaterial. The inventor theorizes that this is due to all of the components being in a more activated state as they support each other in the admixture.

The efficiency of an organic solvent/compound to disperse carbon nanomaterial allows a significant increase in the loading of carbon in the admixtures and hence drastically reduces the dosage volume needed for concrete applications. For admixtures produced using the method, we are typically working in a dosage range of 2 to 64 oz per yard of concrete, equal to 1/64 to 1/2 gallon per yard.

The admixture can also include a concrete accelerator mixed with the organic solvent/compound mixture. For example, the concrete accelerator can be selected from the group of known inorganic concrete accelerators such as; NaSCN, $NaNO_2$, $Ca(NO_2)_2$, $NaNO_3$, $Ca(NO_3)_2$, $CaCl_2$), and combinations thereof.

In addition, the admixtures can also include or be based on a plasticizer. For example, polycarboxylate based plasticizers will assist in the dispersion of carbon nanomaterial and can assist in adjusting the wet properties of the concrete if desired, or if the carbon nanomaterial and alkanolamines changes these properties significantly.

Also with respect to the selecting step, the components of the admixture can be tailored for a particular type of concrete. For example, an amine can be chosen to specifically add reactively to a specific portion of the cementitious material of a mix design, this could for example specifically be the pozzolanic material included in a mix design. Typically, the pozzolans are a part of a concrete mix design, where they constitute a certain percentage of the cementitious material with the rest typically being a cement, typically an OPC (ordinary Portland cement), Example. An object of the present method is to enrich a cement composition with high levels of carbon nanomaterial to give superior mechanical properties, specifically compressive, flexural and split tensile strengths relative to the prior art, but also enhancing secondary effects such as abrasion resistance, shrinkage reduction and reduced permeability. This is done by firstly producing high concentration carbon nanomaterial enriched amine-based cement admixtures and secondly adding these to mortar or concrete mixes during batching to enhance the properties of the resulting hardened mortar or concrete material.

Method of Preparing Cement Admixture

Cement Admixture According to the Present Method (1). 226 g of commercial grade 99% Triethanolamine was charged into a 500 ml glass beaker. 0.05 to 10 grams of dry Carbon Nanomaterial powder was charged into said glass beaker and mechanically agitated such that all the powder has been "wetted" by the Triethanolamine (TEA). While under mechanical mixing 0 to 40 grams of water is added to the TEA/CNT mixture until a homogenous black liquid is obtained.

Cement Admixture According to the Present Method (2). A cement admixture was prepared using the same method as "cement Admixture According to the Present Method (1)", except that 99% N-Methyldiethanolamine (MDEA) was used in place of Triethanolamine.

Cement Admixture According to the Present Method (3). A cement admixture was prepared using the same method as "cement Admixture According to the Present Method (1)", except that technical grade N,N,N',N'-Tetrakis(2-hydroxyethyl)ethylenediamine (THEED) was used in place of Triethanolamine.

Cement Admixture According to the Present Method (4). A cement admixture was prepared using the same method as "cement Admixture According to the Present Method (1)", except that commercially available N,N,N',N'-Tetrakis(2-hydroxyethyl)ethylenediamine (THEED) was used in place of 50% of the Triethanolamine, effectively producing a 1:1 mixture of the two amines. Carbon Nanomaterial was added to this mixture and stirred. Water can be added during the final mechanical mixing step to adjust viscosity.

Cement Admixture According to the Present Method (5). 226 g of commercial grade 99% diisopropanolamine was heated to 70 C in a 1 L glass beaker until a liquid was obtained. 5 to 35 g of water and mixed in said 1 L glass beaker order to obtain a liquid that is stable at standard temperatures and pressures. 0.01 to 10 g of dry Carbon Nanomaterial powder was charged into the glass beaker and mechanically agitated such that all the CNT powder has been "wetted" by the DIPA solution and mixed further until a homogenous black liquid is obtained.

Cement Admixture According to the Present Method (6). A cement admixture was prepared using the same method as "cement Admixture According to the Present Method (5)", except that 99% Triisopropanolamine (TIPA) was used in place of DIPA.

Cement Admixture According to the Present Method (7). A cement admixture was prepared using the same method as "cement Admixture According to the Present Method (1)", but with a metallic salt dissolved in the water fraction added during the final part of the mix sequence. The metallic salt can for example be a thiocyanate salt, such as NaSCN, a nitrite salt, such as $NaNO_2$ or $Ca(NO_2)_2$, or a nitrate salt, such as $NaNO_3$ or $Ca(NO_3)_2$ or combinations of these.

Cement Admixture According to the Present Method (8). A cement admixture was prepared using the same method as "cement Admixture According to the Present Method (1)", but with Aminotris(methylenephosphonic acid) (ATMP) dissolved in the water fraction added during the final part of the mix sequence. Other mono- di- and/or tri-phosphonate or mono- di- and/or tri phosphonic acid can also be used.

Cement Admixture According to the Present Method (9). A cement admixture was prepared using the same method as "cement Admixture According to the Present Method (6)", except that triethanolamine (TEA) was added to the liquid in the final steps of the process at a concentration of 0.5% to 10% of the Triisopropanolamine (TIPA).

Examples of Effect of Admixtures in Hardened Concrete

Example 1: Strength enhancement in a 650 lb/cy 60% slag mix with Admixture #1 at dosages of 16, 24, 36 and 48 oz/cy.

| Trial | EdenCrete Name | Pz Dose oz/cy | 1-day ave | vs ref % | 7-day ave | vs ref % | 28-day ave | vs ref % | 56-day ave | vs ref % |
|---|---|---|---|---|---|---|---|---|---|---|
| 650 C 60% Slag Pz | Reference | 0 | | | 5767 | 0.0% | 9817 | 0.0% | 10710 | 0.0% |
| 650 C 60% Slag Pz | EC Pz #1 | 16 oz | | | 6240 | 7.6% | 10510 | 7.1% | 11623 | 8.5% |
| 650 C 60% Slag Pz | EC Pz #1 | 24 oz | | | 6513 | 12.4% | 10513 | 7.1% | 12183 | 13.8% |
| 650 C 60% Slag Pz | EC Pz #1 | 36 oz | | | 6723 | 16.0% | 11460 | 16.7% | 12670 | 18.3% |
| 650 C 60% Slag Pz | EC Pz #1 | 48 oz | | | 6547 | 12.9% | 11617 | 18.3% | 12677 | 18.4% |

Example 2: Strength enhancement in a 650 lb/cy straight cement mix with Admixture #1 at dosages of 8, 16, 24 and 32 oz/cy.

| Trial | EdenCrete Name | Pz Dose oz/cy | 1-day ave | vs ref % | Compressive Breaks 7-day ave | vs ref % | 28-day ave | vs ref % |
|---|---|---|---|---|---|---|---|---|
| 650 C NY cem | Reference | 0 | | | 6843 | 0.0% | 8103 | 0.0% |
| 650 C NY cem | EC Pz #1 | 8 oz | | | 7127 | 4.2% | 8587 | 6.0% |
| 650 C NY cem | EC Pz #1 | 16 oz | | | 7153 | 4.5% | 8640 | 6.6% |
| 650 C NY cem | EC Pz #1 | 24 oz | | | 7563 | 10.5% | 9220 | 13.8% |
| 650 C NY cem | EC Pz #1 | 32 oz | | | 7453 | 8.9% | 9093 | 12.2% |

Example 3: Strength enhancement in a 750 lb/cy ternary mix (OPC+slag+fly ash) with Admixture #1 and #8 at dosages of 20, 24, 30 and 32 oz/cy.

| Trial | EdenCrete Name | Pz Dose oz/cy | 1-day ave | vs ref % | Compressive Breaks 7-day ave | vs ref % | 28-day ave | vs ref % | 56-day ave | vs ref % |
|---|---|---|---|---|---|---|---|---|---|---|
| Tri-Mix 750 C | Ref | 0 | | | 7363 | 0.0% | 9133 | 0.0% | 10143 | 0.0% |
| Tri-Mix 750 C | EC Pz #1 | 20 oz | | | 7807 | 6.0% | 10603 | 16.1% | 11383 | 12.2% |
| Tri-Mix 750 C | EC Pz #1 | 24 oz | | | 7900 | 7.3% | 10503 | 15.0% | 11667 | 15.0% |
| Tri-Mix 750 C | EC Pz #1 | 30 oz | | | 8520 | 15.7% | 11623 | 27.3% | 12450 | 22.7% |
| Tri-Mix 750 C | EC Pz #8 | 32 oz | | | 8090 | 9.9% | 11120 | 21.8% | 11923 | 17.5% |

Example 4: Strength enhancement in a 850 lb/cy 20% class C fly ash mix with Admixture #1, #3 and #4 all at a dosage of 23 oz/cy.

| Trial | EdenCrete Name | Pz Dose oz/cy | 4-day ave | vs ref % | Compressive Breaks 7-day ave | vs ref % |
|---|---|---|---|---|---|---|
| CO 850C 20% class C FA | Reference | 0 | 6329 | 0.0% | 6731 | 0.0% |
| CO 850C 20% class C FA | EC Pz #3 | 23 | 7596 | 20.0% | 7878 | 17.0% |
| CO 850C 20% Class C FA | EC Pz #4 | 23 | 5915 | −6.5% | 6310 | −6.3% |
| CO 850C 20% class C FA | EC Pz #1 | 23 | 6707 | 6.0% | 7291 | 8.3% |

Example 5: Abrasion resistance in a straight Portland, Holcim I/II, Colorado mix design with Admixture #3 and #9 at low dosage, 0.1 w/w %, and high dosage, 0.3 w/w %. FIG. 2 illustrates the results.

Example 6: Results of abrasion resistance studies for six concrete mix designs of different Portland types with and without fly ash (including Example 5 from above). Presented in table I and II are abrasion resistance quantified using two metrics, wear rate and depth of abrasion at 20 minutes. Both methods tended to yield similar trending results. Table I and II summarize both the wear rate and depth of abrasion at 20 minutes (the elective termination of the test).

TABLE I

Wear Rate Improvement

|  | EC Pz #3 0.1 w/w % | EC Pz #3 0.3 w/w % | EC Pz #9 0.1 w/w % | EC Pz #9 0.3 w/w % |
|---|---|---|---|---|
| Devil's Slide Bridger F-ash | 40% | 60% | 44% | 50% |
| Laramie PS F-Ash | 25% | 17% | 19% | 46% |
| Sugar Creek PS F-Ash | 35% | 40% | 37% | 34% |
| Holcim I/II PS F-Ash | 47% | 44% | 54% | 60% |
| Holcim I/II | 32% | 42% | 41% | 48% |
| Holcim I/II NE Plaines C-Ash | 35% | 37% | 45% | 34% |

TABLE II

Depth of Wear Improvement

|  | EC Pz #3 0.1 w/w % | EC Pz #3 0.3 w/w % | EC Pz #9 0.1 w/w % | EC Pz #9 0.3 w/w % |
|---|---|---|---|---|
| Devil's Slide Bridger F-ash | 31% | 48% | 28% | 36% |
| Laramie PS F-Ash | 25% | 22% | 28% | 39% |
| Sugar Creek PS F-Ash | 26% | 33% | 29% | 24% |
| Holcim I/II PS F-Ash | 41% | 43% | 46% | 55% |
| Holcim I/II | 21% | 23% | 32% | 31% |
| Holcim I/II NE Plaines C-Ash | 33% | 32% | 45% | 26% |

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A method for making an admixture for concrete comprising:
    providing a mix design for the concrete, the mix design including hewing a cementitious material comprising a pozzolanic material;
    providing a carbon nanomaterial comprised of carbon nanoparticles having a predetermined percentage range by mass of the admixture;
    wetting and dispersing the carbon nanomaterial in a liquid organic solvent/compound mixture comprised of an amine based compound configured to de-agglomerate and uniformly disperse the carbon nanoparticles; and
    selecting the organic/solvent compound mixture and the amine based compound to perform the wetting and dispersing step;
    the selecting step including:
    providing a dosage of the admixture in the mix design to provide a concentration level of the carbon nanomaterial sufficient to enhance mechanical properties of the concrete including compressive, flexural and tensile strength, and
    choosing the amine based compound to produce a reaction with the pozzolanic material,
    with the carbon nanomaterial and the amine based compound configured to enhance secondary properties of the concrete including abrasion resistance, shrinkage and permeability.

2. The method of claim 1 wherein the dosage of the admixture in the mix design is between 2 to 64 oz per yard of the concrete.

3. The method of claim 1 further comprising adding water to the organic/solvent compound mixture after the wetting and dispersing step.

4. The method of claim 1 wherein the organic solvent/compound mixture comprises an alkanolamine.

5. The method of claim 1 wherein the organic solvent/compound mixture comprises a compound selected from the group consisting of mono-ethanolamine, di-ethanolamine, tri-ethanolamine, tri-isopropanol amine, N-methyldiethanolamine, diethanolisopropanolamine (DEIPA), ethyldiisopropylamine (ED IPA), N,N,N',N'-tetrakis-(2-hydroxyethyl)-ethylenediamine (THEED) and N,N,N',N'-tetrakis-(2-hydroxypropyl)-ethylenediamin (THPE/EDTP).

6. The method of claim 1 wherein the carbon nanoparticles comprise particles selected from the group consisting of carbon nanotube particles, carbon nanofiber particles, graphene particles, graphite particles, carbon black, polycrystalline carbon particles, nanodiamonds, and single-layer or multi-layer fullerene particles.

7. An admixture for making concrete comprised of a cementitious material comprising a pozzolanic material, the admixture comprising:
    a suspension of uniformly dispersed carbon nanoparticles having a predetermined percentage range by mass of the admixture in an organic solvent/compound mixture configured to uniformly disperse the carbon nanoparticles in the organic solvent/compound mixture,
    the organic solvent/compound mixture comprising an amine based compound, the amine based compound configured to react with the pozzolanic material,
    the carbon nanomaterial in the admixture having a concentration level sufficient to enhance mechanical properties of the concrete including compressive, flexural and tensile strength,
    the carbon nanoparticles and the amine based compound configured to enhance secondary properties of the concrete including abrasion resistance, shrinkage reduction and reduced permeability.

8. The admixture of claim 7 wherein the amine based compound comprises an alkanolamine.

9. The admixture of claim 7 wherein the amine based compound comprises a compound selected from the group consisting of mono-ethanolamine, di-ethanolamine, tri-ethanolamine, tri-isopropanol amine, N-methyldiethanolamine, diethanolisopropanolamine (DEIPA), ethyldiisopropylamine (EDIPA), N,N,N',N'-tetrakis-(2-hydroxyethyl)-ethylenediamine (THEED) and N,N,N',N'-tetrakis-(2-hydroxypropyl)-ethylenediamine (THPE/EDTP).

10. The admixture of claim 7 further comprising a concrete accelerator mixed with the organic solvent/compound mixture.

11. The admixture of claim 10 wherein the concrete accelerator comprises a thiocyanate salt.

12. The admixture of claim 11 wherein the thiocyanate salt comprise a compound selected from the group consisting of NaSCN, NaNO2, Ca(NO2)2, NaNO3, Ca(NO3)2 and combinations thereof.

13. The admixture of claim 7 further comprising a concrete hydration stabilizer mixed with the organic solvent/compound mixture.

14. The admixture of claim 13 wherein the concrete hydration stabilizer comprises a mono- di- and/or tri-phosphonate or mono- di- and/or tri phosphonic acid.

* * * * *